M. D. MULFORD, Jr.
Bee Hive.
No. 56,782.
Patented July 31, 1866.
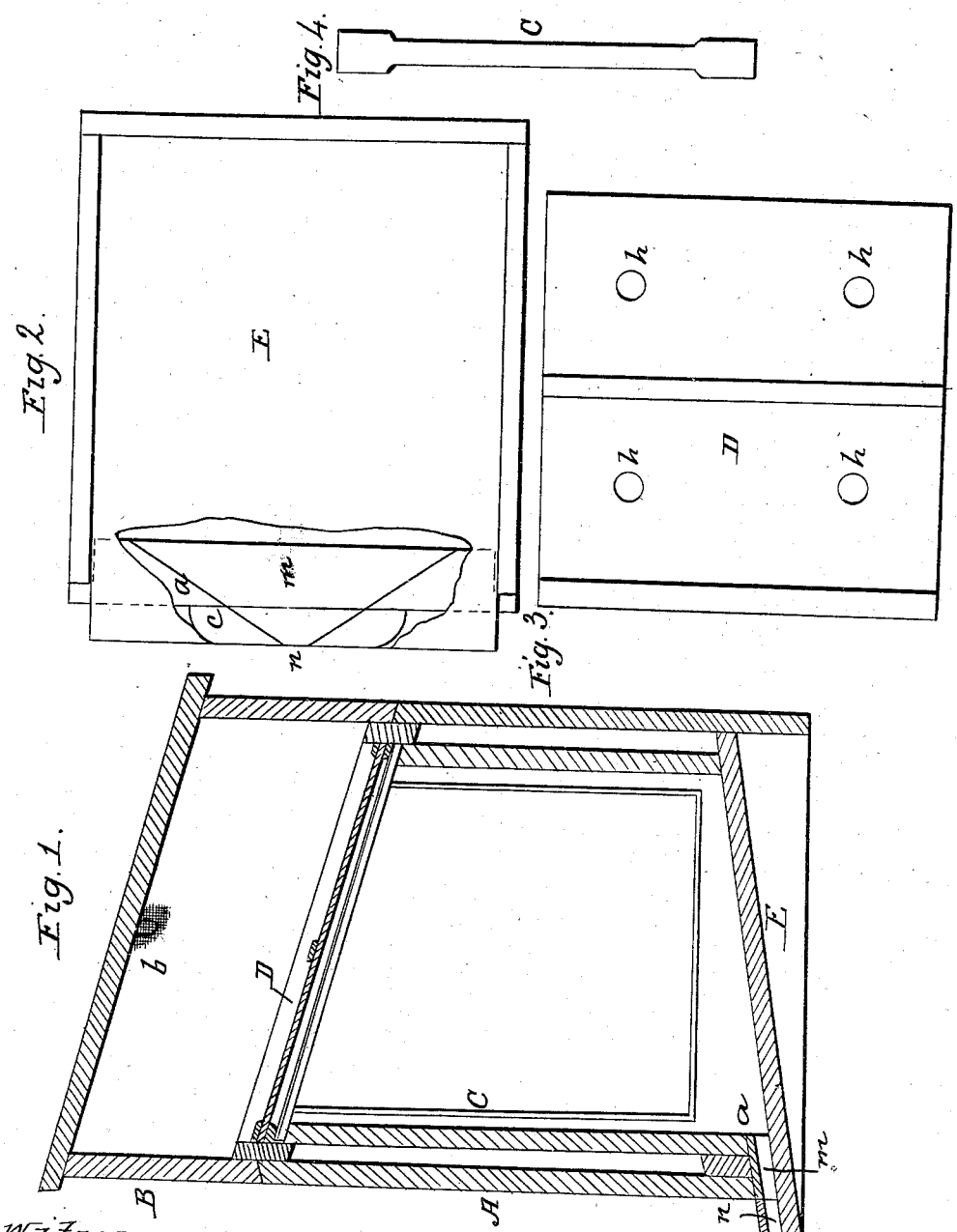
Witnesses:
P. T. Dodge
G. R. Nebinger
Inventor:
M. D. Mulford
by his Attorney
W. C. Dodge.

UNITED STATES PATENT OFFICE.

M. D. MULFORD, JR., OF NEW PROVIDENCE, IOWA.

IMPROVEMENT IN BEE-HIVES.

Specification forming part of Letters Patent No. 56,782, dated July 31, 1866.

*To all whom it may concern:*

Be it known that I, M. D. MULFORD, Jr., of New Providence, in the county of Hardin and State of Iowa, have invented certain new and useful Improvements in Bee-Hives; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention relates to that class of hives in which movable comb-frames are used; and it consists in forming the top of the frames inclined and locating them in a double-walled hive, together with devices for regulating the size of the entrance to the hive.

A represents the body of my hive, which may be made of any desired form and size, it being constructed with double walls with an air-space between, as shown clearly in Figure 1. The front wall of the hive is made considerably higher than the rear, and the frames C are made of a corresponding shape, the top cross-bar inclining at an angle of about thirty degrees, which is done for the purpose of inducing the bees to build their comb straight, my experiments having demonstrated the fact that bees are far more likely to build their comb straight when attaching it to inclined supports than when attached to horizontal bars.

The top cross-bar of the frame C is made in the form shown in Fig. 4, so that when placed near together a space will be left on each side for the passage of the bees between them. This bar is made wider than the other pieces composing the frame, and projects at each end, as shown in Fig. 1, these projecting ends resting on the top of the inner walls of the hive to support the frames.

D represents a board having holes $h$ in it, which is placed directly over the frames C, and having cleats at each end resting on the frames C, to allow room for the passage of the bees between the top of the frames and the board D.

B represents a box fitted upon the top of the main hive A, in which smaller boxes may be placed to receive surplus honey, a hole covered with wire-gauze, as at $b$, being made in each of the sides for ventilating purposes.

At the front of the hive an open space extends entirely across the hive, directly above the bottom board E, which projects at the front side, as shown in Fig. 1. Into this space is fitted a piece, $a$, having its under side cut away, as shown at $m$ of Fig. 2, which is a bottom-plan view, with a portion of the bottom board E broken away to show this feature. Another smaller piece, $c$, is placed directly in front of this piece $a$, and has an opening or passage, $n$, cut on its under side, as shown, this last piece being secured in place by pins projecting from its under side and fitting into holes in the bottom board E.

The object of this arrangement is to provide an opening for the passage of the bees that is very small at the extreme outer point, and which can therefore be easily defended against the entrance of the moth and other enemies, and still allow as much room as possible for the bees to pass each other as soon as they are within the opening.

In the working season, and when the colony is strong, the outer piece, $c$, may be removed and replaced when the swarm is feeble or when not working much.

Having thus described my invention, what I claim is—

1. The hive A, having its top and bottom inclined, as shown, with its lower walls made double and provided with the removable frames C, having their top bar inclined, as set forth.

2. The additional mouth-piece $c$, provided with the opening $n$, in combination with the piece $a$, having the opening $m$, when said pieces are arranged in relation to each other and to the hive, as shown and described.

M. D. MULFORD, JR.

Witnesses:
JOHN DUNN,
IRWIN SEWARD,